United States Patent [19]
Nelson et al.

[11] Patent Number: 5,490,333
[45] Date of Patent: Feb. 13, 1996

[54] THREE POINT TRI-ROLL THREADED RING GAUGE THAT IS ADJUSTABLE WITH WEAR DETECTORS

[76] Inventors: Russell Nelson, 161 Newbury St., #29, Peabody, Mass. 01960; John LeBlanc, 141 Bacon St., Natick, Mass. 01760

[21] Appl. No.: 191,270

[22] Filed: Feb. 1, 1994

[51] Int. Cl.⁶ ....................................... G01B 3/48
[52] U.S. Cl. .................... 33/199 R; 33/501.1; 33/555.2; 33/DIG. 11
[58] Field of Search ................................ 33/501.1, 501.2, 33/501.08, 501.09, 555.1, 555.2, 199 R, DIG. 8, DIG. 11

[56] References Cited

U.S. PATENT DOCUMENTS

| | | | |
|---|---|---|---|
| 1,908,253 | 5/1933 | Johnson | 33/199 R |
| 2,218,111 | 10/1940 | Johnson | 33/199 R |
| 2,249,954 | 7/1941 | Hellberg et al. | 33/199 R |
| 2,355,007 | 8/1944 | Mitchell | 33/DIG. 11 |
| 3,388,476 | 6/1968 | Johnson | 33/555.2 |
| 4,965,936 | 10/1990 | Sentman | 33/199 R |

*Primary Examiner*—Alvin Wirthlin

[57] ABSTRACT

A device to measure round objects, especially threaded objects is shown where three cam surfaces located on the interior of an annular ring are contacted by rollers which are advanced or retracted as a cam surface is traversed. The traverse of the cam surface allows change in diameter formed by the rollers and by locking the cam position, a fixed gauge is formed. The rollers directly contact the part to be measured. As applied to thread measurement, the three point gauge uses annular rollers to measure properties of thread fit and use when the rollers have the threads slightly offset from each other to make a pitch test set. The device allows a single gauge to handle at least 12 normal go and no-go gauging functions with just change of rollers for various fit and pitch classes. The gauge also is settable at special sizes near a standard size due to a range of adjustment.

10 Claims, 3 Drawing Sheets

THREE POINT TRI-ROLL THREADED RING GAUGE THAT IS ADJUSTABLE WITH WEAR DETECTORS

BACKGROUND OF INVENTION

1. Field of Invention

The invention covers a three point gauge for measurement of external thread forms and OD's of parts. The gauge is both adjustable and has wear evident contact points. The gauge which has direct contact between an interior cam surface and part contacting rollers is especially effective in determination of thread classes by use of annular threaded rollers adjusted for various thread pitches. This gauge can be hand set or attached to indicating devices.

2. Prior Art

Metrology, the science of measurement, requires immense amounts of size indicators and standards to check each size indicator. In the case of measurement of outside diameter of objects, especially round outside diameters (OD's) of shafts, bolts and other objects, the size is often measured by the supplier, and the size is checked on receipt or in production by use of a series of go or no go gauges. In the case of threaded parts, bolts, shafts, or fasteners there are the further complications of several thread fit standards and various pitches of threads. The covering of all fits and pitches of a given size would require 12 gauges and there still might be off standard sizes not covered. In most cases, measurement is by a variable gauge with an indicator of size, or for more ease of use, by go and no-go gauges which are fixed rings or slots. There is a need for a go and a no-go gauge for each size and class being tested. In critical applications the step between go and no go may be of the magnitude of 0.0001 inch or less, thus a large number of gauges of very high accuracy are needed and they must be constantly checked to insure there is no wear which would affect the accuracy of the gauge. This is critical in many high technology applications where bolts or pins are used to both fasten and to align parts. The resultant need for accuracy in sizing has provided a major industry in standard and special gauges for pins, bolts, and special parts. The machine shop or precision assembly shop may have to store a vast number of gauges. They must have the go and no-go gauges, standards, and backups for replacement. Gauges thus can represent a major capital investment for these shops. At present gauges are for one fixed size only. There is a need for gauges that provide accurate go and no-go measurements but which can be easily set to cover a variety of sizes and/or classes of fit.

The basic metrology problem is made much worse by a common ploy of manufacturers to make parts slightly different that the standard sizes to thus require the use of the manufacturers replacement parts rather than shelf replacement parts. As a result there is a vast number of parts that are close to standard size but differ by just enough to require separate gauges and test equipment. The number of sizes further emphasizes the unmet need for a simple but variable setting go no-go gauge system.

Gauges are often precision ground holes in a hardened metal part. Such gauges are easy to manufacture but they are hard to use and can be easily damaged. The typical gauge is thus a round hole gauge with a sliding fit over part sizes.

Machinists have long used vee blocks and holddowns to hold and fix round or irregular shaped OD parts prior to machining. The vee block is usually either a 90 or a 120 degree included angle hardened steel surface. For the most exacting uses it may be made from granite to curb wear. The 120 degree angled blocks are especially favored. The use of the vee blocks was recognized by gauge manufacturers and the concept is incorporated in many gauges.

The initial simple hole gauge concepts are common in go and no go gauges. In measuring, where there is an actual indicator of size, these hole gauges have largely been abandoned and three point gauges are common. The three point system uses the concepts of the vee block holddowns. The prevalent type of gauge is a vee shaped anvil where the enclosed angle of the anvil vee is 120 degrees and where the anvil thus holds a round part at two contact points with a micrometer indicator reading a third point offset by 120 degrees from the two anvil contact points. Such a system is accurate, and by mere modification of the micrometer scale is direct reading. Since reading a micrometer is a skill and since a micrometer can easily be misread, go and no-go gauges are still the main QC check on parts.

The vee anvil micrometer and similar gauges have been improved with free spinning rollers, offset by 120 degrees from each other, providing the points of contact with parts that were done with the 120 degree angled anvil. The use of the limited contact of this three point contact system provides less surface in contact with the parts without loss of accuracy. In fact, since dents are eliminated in the gauging surfaces, the accuracy is often much better with the three point system. The accuracy is also enhanced by the fact that the three point roller gauges have the rollers freely rotating so that the surface in contact with the parts is randomized and wear is well distributed over the roller surfaces. The downside to this roller system is that wear accumulates in the roller system and the system slowly starts to give non-standard measurements. Usually this gradual side in accuracy is very hard to notice and may give marginal readings on parts for a period of time before it is clearly identifiable. There is a need for a simple and effective method to use the advantages of the three point system and still be able to detect wear and cure this wear. There is also a need to provide the easy of use of a direct reading system and its adjustability to a go and no-go gauge system. A further advantage of such a system would be a greatly reduced gauge inventory.

Expansions of the anvil and the multipoint or three point gauge have been made. In many of these gauges, complex lever arm and/or spring loaded arms are used that add linkages or cumulative tolerances that result in gauge variations. Key to an effective gauge is a minimum number of parts in linkages and a direct metal to metal contact between all parts that eliminates cumulative error and linkage slide, thus making the gauge more accurate. Three point systems usually have linkage or pressure sensitive elements that add error. An ideal gauge would eliminate these linkage based sources of error.

There are further problems in a specific area of metrology, the measurement of thread fit. A series of thread classes are used to indicate the thread fit characteristics. To measure a given class of fit, a special contact thread is needed for the go and no-go gauge that is totally traceable to QC standards. If two different fit classes are checked in a size of bolt, thus 4 gauges would be needed in addition to test standards. Each fit class requires a different thread also. This is further compounded by the prevalence of special sizes that are only close to the standard sizes. Such specials are common to force users to buy parts from the manufacturers. Each special also needs a set of gauges to test it. As can be noted, the number of gauges rapidly becomes a major expense.

There is a need for a test procedure that minimizes the need for gauges.

SUMMARY OF INVENTION

The invention utilizes a cam wedge system to advance a set of roller contact points or other contacting devices which are thrust by the wedge, which is a cam surface, toward a center point of the gauge by the gradual slope of the cam/wedge action which in incorporated as part of a housing of a gauge. The gauge further has no arms holding the contact points and is configured so that, in the preferred version, the contact points are rollers in direct contact with the cam shaped segments within an annular ring. The rollers further can be indexed sequentially into any one of a series of positions to remove worn surfaces and to insure gauge accuracy. The rollers or contact points may further be made with wear evident coatings or surface layers that provide the accuracy and traceability required by modern quality standards such as ISO-9000 standards. Finally, when the rollers incorporate threads, the gauge allows a single gauge set with a traceable set plug to qualify the roller positions and thus determine go and no-go sizes for both class 2A and class 3A threads of a given size thus replacing a set of 4 individual gauges. The gauge may also be used to replace special pitch diameter and non standard gauge sizes near to a standard size further reducing inventories of expensive gauges.

This invention solves the need for large numbers of special gauges by disclosing a method to form a three point or a multipoint gauge that can be adjusted over a variety of sizes or classes of fit of threads and then can be locked and held at any one size or fit. In the use on threads, the gauge when set on a set pin size indicates the quality of threads.

This invention further discloses a simple wear detection method and provides protection against roller wear while still maintaining the ease of testing of the common three point gauges.

The invention can further provide a readout of unparalleled accuracy in a further expansion of the concept.

The invention consists of a set of rollers that are interlocked by a cam system built into an outer housing ring of the gauge such that rotating of this outer ring advances each separate roller, each roller having a contact point with a part held or used within the gauge. Such contact points will commonly be metal or carbide rollers which may be threaded or of special configurations. The cam moves the part contact rollers to a predetermined position depending on the amount of rotation of the outer, cam containing ring. A cam is basically an inclined plane. In an inclined plane of shallow rise (relatively low height per unit length) the rise or advancement in a vertical plane can be small compared to the motion in the horizontal plane. When applied to a cam action, the small vertical rise for a gradual cam slope provides a large turning distance advancing the cam for a given horizontal motion. Since the geometry of the cam determines the amount of travel of the test rollers, for any size device, a number of different gauges can be tested and replicated with a single cam action gauge and/or a very accurate adjustment is possible. The precision of the rotation in varying sizes is determined by setup accuracy and the slope of the cams which advance the individual rollers. A low angle of the cam slope allows greater ease of setups and more accuracy while a high slope allows more sizes to be handled by one gauge at a sacrifice in accuracy. In normal use, a 0.020 inch range will be covered by each gauge system but this range can be varied by altering the cam angles. An essential feature of the multisize gauge is that it can be locked in the desired size without further movement of the rollers thus allowing repeated testing of a set size.

The rollers of this invention are also provided with a hindered motion that allows the position of any roller to be fixed and locked so wear is no longer random, but the wear is restricted to a defined area. The rollers in addition are easy to replace. In checking threaded parts the advantage of adjustability and easy change rollers is seen since, rather than stock a set of gauges in each size, each pitch, and in each fit class, the rollers may be quickly replaced with other fit rollers or other pitch rollers (20 or 28 pitch for example) converting the gauge easily from a class 2 to a class 3 fit tester for threaded parts. Only different pitch rollers would be needed as inventory in a given size, and a given size gauge still is adjustable over 0.020 inches or more. In addition, in a three point contact gauge, in many cases a thread roller set will be effective for two or more fit classes due to the limited area of contact with the part threads. A drastic reduction in gauges is thus possible with the invention.

The wear surface is a coating that is thin and that has a different luster or color than the substrate. A thin coating of anodizing or of a different metal such as TiN, tin, or gold would provide a visual indicator of wear. Such a surface coating is not practical in freely rotating rollers since the change in color would be distributed and not easily detectable as opposed to the change in a line pattern on an immobile roller. This invention shows wear as a very narrow band of color change along the diameter and located in a line that is parallel to the axis of the roller or in a line on one side of the threads in a threaded roller and the color change indicating wear is thus easily noticeable. Many metals and coatings provide a detectable color change as the thickness is varied by microns of thickness.

Specialized rollers further enhance the usefulness of the invention. An example used in the most preferred version of the invention is the use of all rollers with threads at a 60 degree angle which thus provides root gauging for bolts and further allows a multitude of sizes of bolt root diameters to be measured with the same gauge. This gauge in use also needs be set once for each size measured. Any angle of thread can be supplied in the gauge and only one angle of thread is needed for a family of bolts since the pitch (angle of thread) is common for each thread type. The invention thus allows an easy measure of bolts to class of fit and one gauge covers the collective tolerances allowable and further allows 2A and 3A fits to be determined easily.

Several variations on this concept are also possible. The wear of the rollers does not affect the use of the gauge since, as soon as the wear is noticed, the roller position may be indexed to a non-worn position and the gauge accuracy restored. Indexed change in roller position and resetting to a new position is contra to the common approach of freely rotating rollers but it provides a possibility of accuracy and multiple reuse of the gauge at its most accurate wear point that is impossible in free rotation of the rollers. The rollers will be marked in numbered segments to facilitate the worn area removal and change. Such marked and fixedly advancable roller configurations provide a traceability of gauge accuracy not presently available.

The rotation of the cams built into the outer ring of the multiple size gauge of this invention can also be used to produce a micrometer gauge by provision of index marks and vernier scales on the outer rim of the ring in the invention which would indicate the amount of rotation which in turn is an indicator of gauge roller travel. As low angle cams are used, these marks produce highly accurate linear advance indications for roller movement. The indicator can also thus be used for direct measurement or as a direct reading comparison gauge.

It is noted that linear transformers, electronic or pulse sensitive magnetic or a number of other very accurate indicators can be used to make the roller motion determined in an analog or digital form that further enhances the use of this multisize gauge system.

PREFERRED EMBODIMENT

In the preferred embodiment, a rotatably adjustable gauge is made which is lockably fixable at a given size and where three rollers with thread containing part contacting surfaces 4A are provided. Each roller has lockable position advancing capabilities such that the rollers are controllably advancable in position and each roller is further covered with an oxide coating which provides a visible indication or wear on the roller where it contacts parts.

Figure 1:
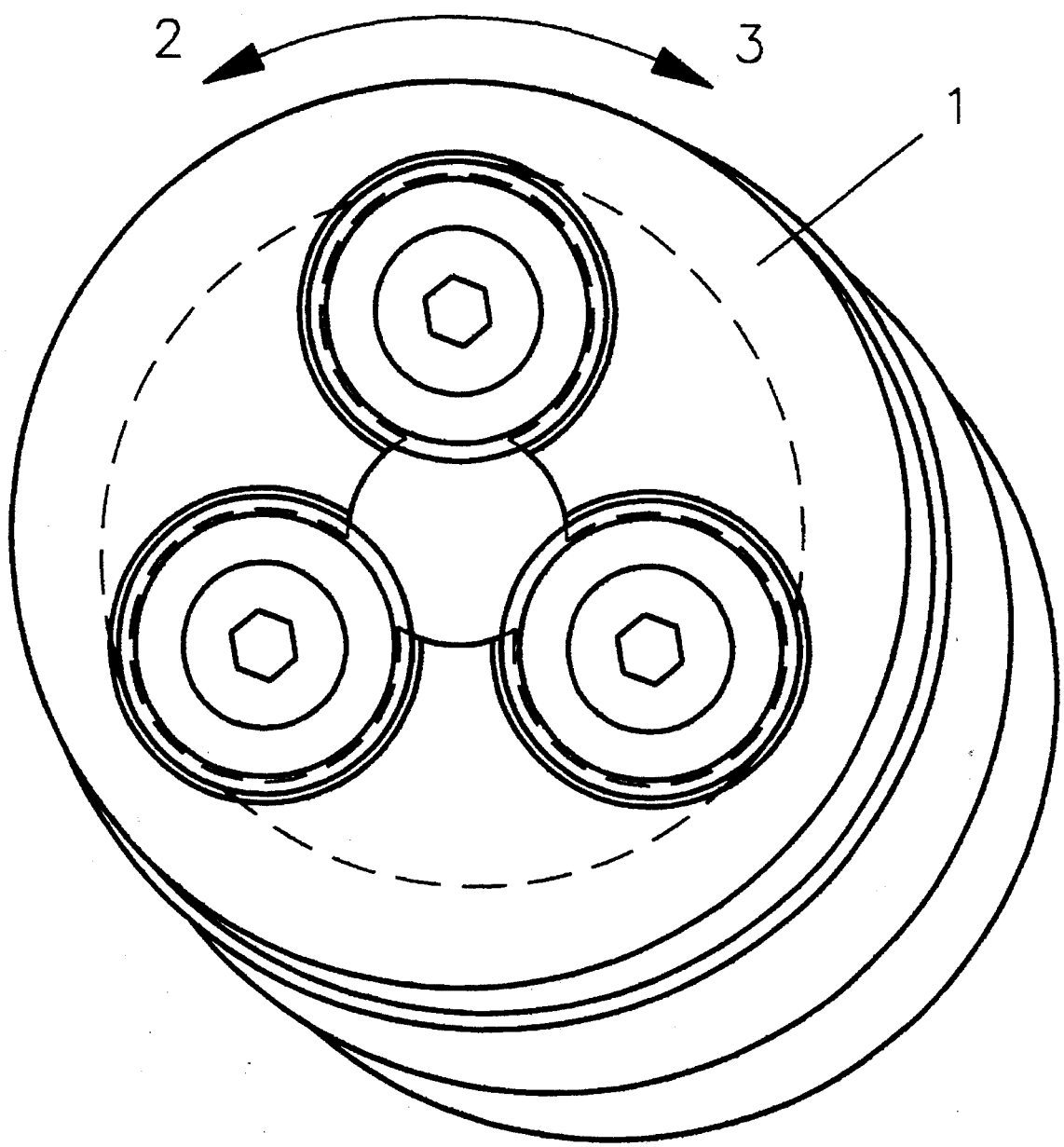
In FIG. 1 an assembled gauge is shown with the outer cam containing housing shown rotating in directions.

In the following descriptions the figures will be used to show particular portions of the invention. These figures contain the following numbered parts for reference:

In FIG. 1 an assembled gauge is shown with the outer cam containing housing shown rotating in directions. 2 and 3. The three thread containing coated contact rollers 4 are shown at 120 degree offset from each other around a central hole set to the desired diameter of test part.

Figure 2:
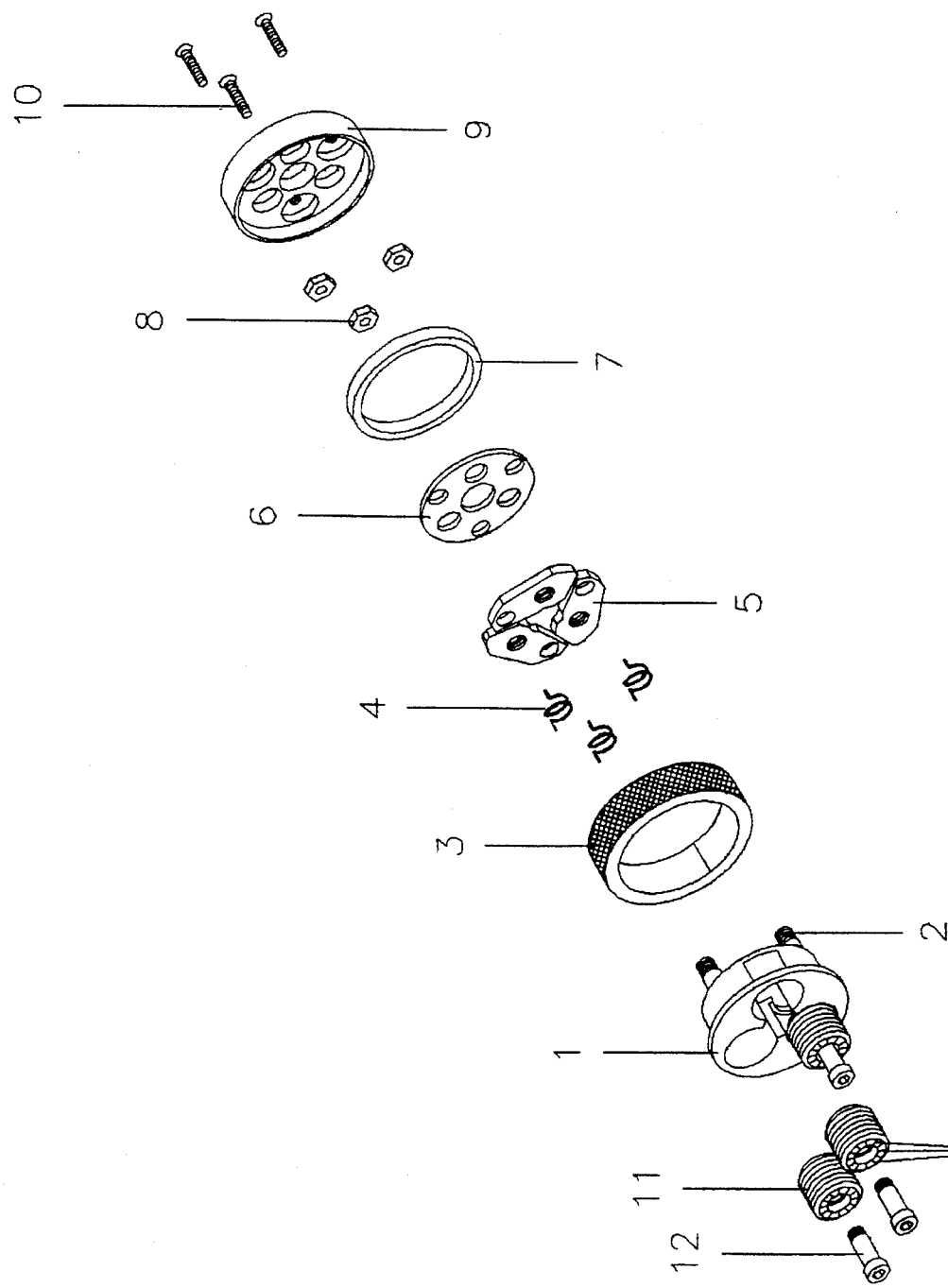
FIG. 2 shows a gauge disassembled.

FIG. 2 shows a gauge disassembled. The cam containing housing 1A is shown with the division between two cam sections on the inside 10 visible. Within the cam containing housing is a arm holding support 11 with three holes 12 each of which holds a roller containing one roller 4A. Arms 5 hold the rollers and have a contact surface 6 which is in contact with the rollers. Plate 7 is a retainer holding the arms and a back housing 8 attaches the arm holding support rotatably within the cam containing housing. A bolt 21 through the thread containing roller fixes its position while marks 22 show the position of each roller to indicate the rotation of a worn roller area to a non-worn surface.

Figure 3:
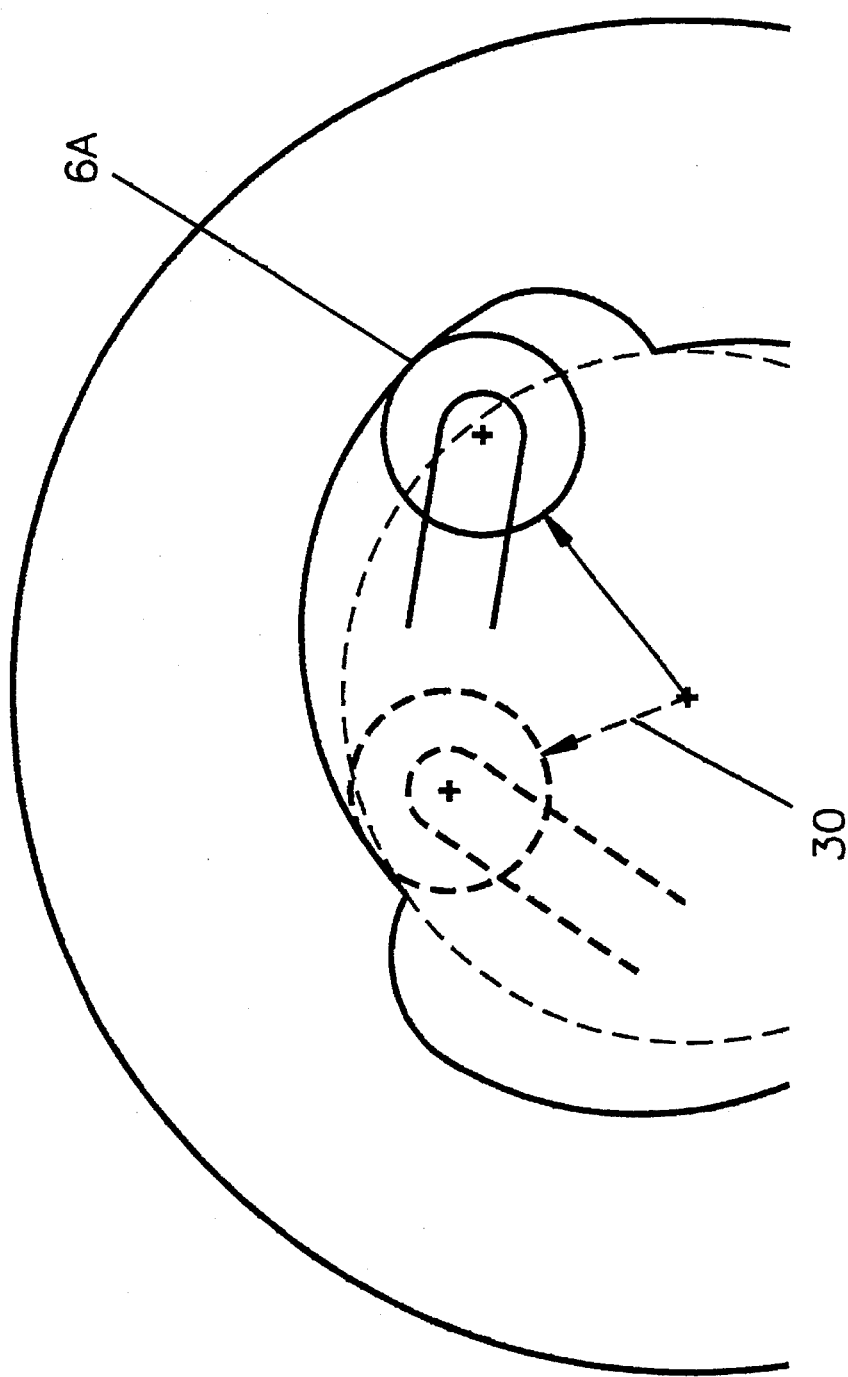
FIG. 3 shows an exaggerated cam acting on one arm at a contact point. A dotted shadow arm shows the advancement of the arm along the cam which forces the contained roller inward toward the center in direction.

FIG. 3 shows an exaggerated cam acting on one arm 5 at contact point 6A. A dotted shadow arm shows the advancement of the arm along the cam which forces the contained roller inward toward the center in direction 30.

The outer cam containing housing 1A is a key element in the design. A round part in ring shape is made by lathe turning an outside diameter and an inside diameter to form an annulus. This annular ring is then mounted in a milling machine and the center of the ring is located. The ring is then moved on the indexable table such that the center of the ring is offset by a calculated amount and a cam surface 10 is machined which starts at the inner surface of the annular ring and is cut to an increasing depth as the annular ring is rotated through an arc of 105 degrees. The depth of the cut at its deepest point is approximately 0.014 inches. A uniform blend of the deep portion of the milled cut toward the inner surface of the annular ring is then made over the next 15 degrees of rotation such that at 120 degrees of rotation, the mill has returned to the inner surface of the annular ring. This process is repeated two more times as the ring is advances through successive 120 degree rotations. The milled inner surface now contains three uniformly spaced sloping cam surfaces each extending for a rotational distance of 105 degrees then, at the deepest part of the cam, blending back to the inner radius of the original annular ring. This creates three cam surfaces.

The outer cam containing surface can be made from prehardened steel and the cam surfaces ground into the surface or it can be made from tool steels and rough cut, then hardened and precision ground to finish the cam shapes. Alternatively the parts can be made by wire cutting the part from hardened stock into a finished shape then precision grinding.

The outer cam containing housing is also machined on its external diameter by knurling this outer surface or otherwise machining a grip pattern on this outer surface to provide a grip surface 24 that will allow the setup technician to turn the housing easily before it is locked into a fixed position.

The roller holding arms 5 are constructed so that they slidably allow motion of the rollers inward toward the center of the annulus or outward in the reverse direction. The arms allow each roller to be locked into a fixed position by a bolt 21 that is mounted within a center hole of each roller 4A. This restrains motion of each roller and allows limited and controlled advancing of the roller rotation as the roller wears. Each arm 5 is located outside the cam surface and allows the motion inward or outward of the roller without interfering with the contact along a plane parallel with the axis of the roller and the cam which is also the thickness of the roller. The center hole 25 in each arm 5 is fit with a pivoting pin that is attached to the rear of the roll holding assembly 11. Each arm swivels around its pivoting pin and, at its extreme end away from the cam contacting surface, has a roller holding hole 26 which is threaded and which holds the part and cam contacting rollers. These rollers are affixed to the arms by the piloted position fixing bolt 21 whose threaded end is attached within the threaded roller holding hole in the arm.

The pivoting pins are attached to a second spacer plate 7 and this plate is further restrained by a retaining ring 28 which allows a nut 29 to further be used to securely lock the spacer plate to a rear plate.

The part contacting rollers are long in relation to their diameter and would cause errors in measurement if they could deflect. As a result, these critical rollers are further located within a roller holding assembly 11 where close tolerance holes are provided to support the part contacting rollers and to prevent the deflection of these critical rollers. The roller holding assembly consists of one hole 12 for each cam and part contacting roller and this part merely acts to locate the rollers and to insure they directly contact the cam surface and the part in a direction parallel to the axis of the cam segments and to the axis of the rollers. This roller housing rotates with the rollers as they are advanced by turning of the cam assembly (which is externally knurled).

Springs 35 are provided to force alignment of the parts and to make the cam contacting roller surface stay in contact with the cam surface as the cam opens and closes.

The part contacting rollers have a further feature. As noted in the description, and looking at the bolt together assembly, the rollers are fixed in position. The fixed position of each roller is caused by the attachment to the arms by individual position fixing bolts 21 through the center of each roller. Each roller is further made with index marks 22 on its exposed end so there is a visible indicator of roller position. The index marks allow a setup technician who notes wear on a roller to change the roller surface to a new and unworn surface by advancing the roller by one index position. After the rotation of the part contacting roller to its new position, the roller position fixing bolt is tightened to prevent the rotation of the roller and to maintain the new unworn surface in contact with the parts. Each roller can thus be rotated to several unworn positions before it needs replacement. The feature that keeps high tolerance in the system is the fact that the contact between the roller and the cam and the part is a direct contact so that the tolerance of the roller and not the cumulative tolerance of the roller, arm, shaft of the bolt collectively determine the system accuracy since the arms do not function in the tolerancing between the part and the cam surface. It is noted that to accommodate this direct contact the holes in the roller housing 11 cut through this housing 36 as shown and on the inner or center side of the housing these holes also cut through the housing 37 so that the roller may contact parts within the gauge.

The part contacting roller rotation advancing is further enhanced by use of a coating to indicate wear. Black iron oxide coatings or a very thin plating is applied to the surface of the part contacting roller to provide a noticeable color to the surface. When this color is absent, there is an indication of wear that suggests checking of gauge accuracy and which further suggests an indexing of the roller positions to a new unworn position.

The drawing in FIG. 3 shows a cutaway emphasized view of the cam surface and a roller in two positions to illustrate the size change of the gauge before it is locked into a position. In normal use, the gauge will be locked in a position around a set pin to provide a traceable size and then will be a go or no go gauge at that size until it is changed to another set pin size.

In a second preferred embodiment, the rotary motion of the cam housing ring in comparison to the motion of the back plate is detected with a micrometer readout or dial indicator and this amount is related by scales or conversions to the change in diameter of the space defined by the part contacting rollers.

In a third embodiment, the parts contacting rollers are threaded to read the minimum thread depth of a round threaded object. Noteworthy is that one set of threaded part contacting rollers can read a number of sizes of bolts since little of the thread portion actually contacts the part.

In a fourth embodiment, the gauge is modified for use as a thread gauge check device. A set of annular rollers is employed for this thread checking, thus saving on machining costs. A helical angle is formed by precessing each roller which has annularly projecting ribs a set amount from the preceding roller, thus lengthening the distance from the roller end to the first projecting annular rib as the rollers precess from position one to position two and to position three, thus forming a 60 degree helical angle and accommodating any of a variety of thread pitches depending on the set amount of offset. This method also allows the testing of J thread with a J shape tip on annular roller shape.

It is noted that the use of words in this description take their meanings from the context used and that broader usage should not be implicated in the words so used. Further, it is noted that this invention is in its early stages and that while the concepts will remain the same, the actual detection methods, the shape and the details of construction may change as the concept is further developed and made more manufacturable.

We claim:

1. A gauge to measure round objects where an annular cam ring with an inner surface diameter has three cam segments at repeating intervals cut into the inner surface of said annular cam ring, said cut ranging from said surface to a maximum depth then is blended back into the inner surface diameter of said annular cam ring, and where a first roller is in contact with a first cam of said segments, said first roller attached to a first arm which is pivotably located by first pivoting means and which holds one end of said first roller by holding means such that said first roller is in contact with said first cam surface and may sildably move in contact with said first cam surface and where said first roller is contained within a housing means which locates the axis of said first roller in a position parallel to the axis of said first cam surface, and allows direct contact with both said first cam surface and a part, and where a second roller is in contact with a second cam segment and said second roller is attached to a second arm which is pivotably located by second pivoting means and which holds one end of said second roller by said holding means such that said second roller is in contact with said second cam surface and may slidably move in contact with said second cam surface and where said second roller is contained within a said housing means which locates the axis of said second roller in a position parallel to the axis of said second cam surface, and allows direct contact with both said first cam surface and a part, and where a third roller is in contact with a third cam segment and said third roller is attached to a third arm which is pivotably located by third pivoting means and which holds one end of said third roller by said holding means such that said third roller is in contact with said third cam surface and may slidably move in contact with said third cam surface and where said third roller is contained within said housing means which locates the axis of said third roller in a position parallel to the axis of said third cam surface, and allows direct contact with both said third cam surface and a part and where each said pivoting means is held in place by a pin attaching it to said arms.

2. The gauge in claim in 1 where each said pivoting means is a bolt or pin.

3. The gauge in claim in 1 where each said holding means is a bolt which firmly grips and prevents rotation of said roller.

4. The gauge in claim 3 where a further index marking means is provided to track the surface of each said roller in contact with a part.

5. The gauge in claim 4 where each said roller is coated with a coating means that provides visible wear indication.

6. The gauge in claim 3 where each said bolt is located within a bore in a said roller and provides easy replacability of said roller.

7. The gauge in claim in 1 where each said housing means is a machined part where one bore is provided for each said roller and each said bore is open at the exterior surface so each said roller can contact a cam segment and where each said bore is open towards the center of said annulus so each said roller can contact a part.

8. The gauge in claim 1 where each said roller is a threaded roller of a designated thread pitch.

9. The gauge in claim 1 where each said roller is coated with a coating means that provides visible wear indication.

10. The gauge in claim 1 where said cam segments are spaced at 120 degree spacing in said cam ring.

* * * * *